United States Patent
Ericson

(10) Patent No.: US 10,846,516 B2
(45) Date of Patent: Nov. 24, 2020

(54) VISIBLE LIGHT IDENTITY VERIFICATION SYSTEMS AND METHODS

(71) Applicant: PAYPAL, INC., San Jose, CA (US)

(72) Inventor: Braden Christopher Ericson, Santa Clara, CA (US)

(73) Assignee: Paypal, Inc., San Jose, CA (US)

( * ) Notice: Subject to any disclaimer, the term of this patent is extended or adjusted under 35 U.S.C. 154(b) by 145 days.

(21) Appl. No.: 15/857,583

(22) Filed: Dec. 28, 2017

(65) Prior Publication Data
US 2019/0205619 A1  Jul. 4, 2019

(51) Int. Cl.
*G06K 9/00* (2006.01)
*H04L 29/06* (2006.01)

(52) U.S. Cl.
CPC ..... *G06K 9/00288* (2013.01); *G06K 9/00234* (2013.01); *G06K 9/00268* (2013.01); *G06K 9/00899* (2013.01); *H04L 63/0861* (2013.01); *H04L 63/105* (2013.01)

(58) Field of Classification Search
None
See application file for complete search history.

(56) References Cited

U.S. PATENT DOCUMENTS

| | | | |
|---|---|---|---|
| 8,862,890 B2 * | 10/2014 | Kamakura | G06F 21/32 382/115 |
| 2016/0283946 A1 * | 9/2016 | Laporta | G06Q 20/40145 |
| 2016/0320837 A1 * | 11/2016 | Swedish | G06F 3/013 |
| 2019/0158491 A1 * | 5/2019 | Burmester | H04L 63/105 |
| 2019/0162885 A1 * | 5/2019 | Nash | G02B 5/28 |

* cited by examiner

*Primary Examiner* — Leon Viet Q Nguyen
(74) *Attorney, Agent, or Firm* — Haynes and Boone, LLP

(57) ABSTRACT

Techniques are disclosed for systems and methods to provide identity verification for protected services. An identity verification system includes an authenticator device configured to provide a visible spectrum optical sequence including an authentication identifier to an authentication station. The authentication station includes an optical sensor configured to capture a time sequence of visible spectrum image data associated with a validated user, and a logic device configured to receive a visible spectrum optical sequence from the optical sensor, verify the authentication identifier, and execute a protected process associated with the verified authentication identifier. The authenticator device includes an optical transmitter and a logic device configured to determine a visible spectrum optical sequence comprising the authentication identifier and to generate the visible spectrum optical sequence using the optical transmitter.

20 Claims, 5 Drawing Sheets

VISIBLE LIGHT IDENTITY VERIFICATION SYSTEMS AND METHODS

TECHNICAL FIELD

One or more embodiments of the invention relate generally to identity verification systems and more particularly, for example, to systems and methods for personal identity verification using visible light.

BACKGROUND

Secure and convenient identity verification has become the base technical hurdle in almost all interactions between service providers and their users. For example, websites that provide protected content want to be sure that an entity requesting the content is their subscriber or a device in control of their subscriber and not a person or script that has gained access through theft of subscriber credentials. Similarly, financial companies want to ensure that money transactions are being requested and fulfilled by verified users and not by cloned or spoofed credentials.

At the same time, users have been inundated with increasingly complex techniques to provide additional identity verification information above and beyond the basic username password prompts, most of which require additional and typically inconvenient user interaction with the service provider or a separate user device (e.g., two factor authentication, sometimes facilitated by an application or device generating or providing one time passwords). Such techniques are relatively prone to user and/or protocol error and generally lack reliable feedback to users as to the initiation and progress of such authentication, which can leave users frustrated both by the inconvenience and the inability to gauge efficacy or progress and attempt to self-help if/when the verification fails.

Thus, there is a need for an improved methodology to provide relatively convenient identity verification, particularly in the context of verifying the identity of a user before granting access to protected services.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
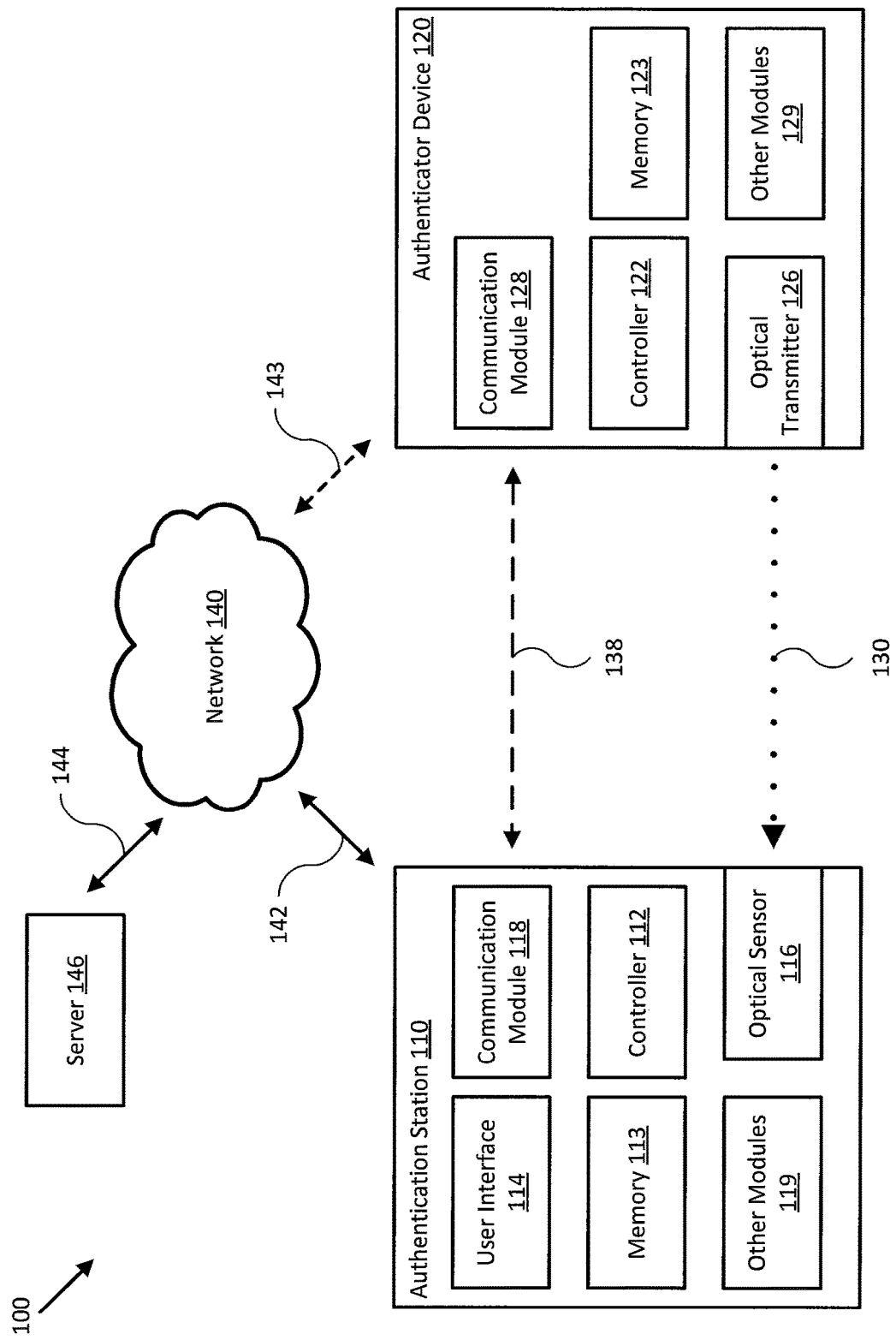
FIG. 1 illustrates a block diagram of an identity verification system in accordance with an embodiment of the disclosure.

Techniques are disclosed for systems and methods to provide identity verification for protected services. An identity verification system may include an authenticator device configured to provide a visible spectrum optical sequence to an authentication station, and the authentication station may be configured to execute a protected process upon verifying the authenticator device and/or a user of the authenticator device. In various embodiments, an identity verification system may include one or more optical sensors, optical transmitters, and/or other elements facilitating identity verification through visible spectrum optical sequences (e.g., a time series of visible spectrum colors, shapes, designs, and/or patterns). For example, an authentication station may include a communication module configured to link to a network and allow the authentication station to send user identity information for verification by a remote server, for example, or to access user identity information stored on the remote server for verification by the authentication station.

In one embodiment, a system may include an authentication station. The authentication station may include an optical sensor configured to capture a time sequence of visible spectrum image data associated with a validated user, and a logic device configured to communicate with the optical sensor. The logic device may be configured to receive a visible spectrum optical sequence from the optical sensor, where the visible spectrum optical sequence comprises an authentication identifier associated with the validated user, verify the authentication identifier, and execute a protected process associated with the verified authentication identifier.

In another embodiment, a system may include an authenticator device. The authenticator device may include an optical transmitter configured to generate a time sequence of visible spectrum light emissions associated with a validated user, and a logic device configured to communicate with the optical transmitter. The logic device may be configured to determine a visible spectrum optical sequence comprising an authentication identifier associated with the validated user, and generate the visible spectrum optical sequence using the optical transmitter.

In a further embodiment, a method may include receiving a visible spectrum optical sequence from an optical sensor, where the visible spectrum optical sequence comprises an authentication identifier associated with a validated user, verifying the authentication identifier, and executing a protected process associated with the verified authentication identifier. In a related embodiment, a method may include determining a visible spectrum optical sequence comprising an authentication identifier associated with the validated user, and generating the visible spectrum optical sequence using the optical transmitter.

In accordance with various embodiments of the present disclosure, identity verification may be provided by an identity verification system including an authenticator device configured to provide a visible spectrum optical sequence to an authentication station, and an authentication station configured to receive the visible spectrum optical sequence and execute a protected process upon verifying the authenticator device and/or a user of the authenticator device based on an authentication identifier embedded within the visible spectrum optical sequence. As noted herein, the authentication station and authenticator device may include one or more optical sensors, optical transmitters, and/or other elements facilitating identity verification through visible spectrum optical sequences, which are time series of visible spectrum colors, shapes, designs, and/or patterns that include a particular authentication identifier associated with a verified user (e.g., verified to access a protected service) that is distributed across the time series/sequence. Embodiments may capture additional collateral visible spectrum image data for auditing purposes, for example, or for supplemental identity verification, as described herein.

FIG. 1 illustrates a block diagram of an identity verification system 100 in accordance with an embodiment of the disclosure. As shown in FIG. 1, system 100 includes an authenticator device 120 configured to provide a visible spectrum optical sequence 130 to an authentication station 110, which may be configured to execute a protected process, such as an application or sub-process stored within a memory 113 of authentication station 110, a communication process to operate a communication module 118, a transaction process, a service login process, a device unlock process (e.g., to unlock authentication station 110 to allow less-restricted or non-restricted user access to a user interface 114), and/or other protected processes, as described herein. In various embodiments, system 100 may optionally include a network 140 and/or a remote server 146, for example, to offload various operations that may otherwise be performed by authentication station 110, and/or to store, update, or otherwise manage user information, validate users and/or user information, and/or provide protected services and/or applications, as described herein.

In general, authentication station 110 of identity verification system 100 may be implemented by a smart phone, personal computer, tablet computer, point of sale, and/or other electronic device including one or more of the elements of authentication station 110 shown in FIG. 1. In FIG. 1, authentication station 110 includes a controller 112, memory 113, user interface 114, an optical sensor 116 capturing a visible spectrum optical sequence 130, communication module 118 facilitating communication links 138 and/or 142, and other modules 119, which may each be configured to facilitate operation of authentication station 110 and/or identity verification system 100. For example, controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for identity verification, for example, or a protected process.

Such software instructions may also implement methods for processing sensor signals, determining sensor information, providing user feedback (e.g., through user interface 114), querying devices for operational parameters, selecting operational parameters for devices, or performing any of the various operations described herein (e.g., operations performed by logic devices of various devices of system 100). In addition, authentication station 110 may be implemented with non-transitory memory 113 (e.g., a non-transitory medium, which may be considered another type of logic device) provided for storing machine-readable instructions for loading into and execution by controller 112, for example, or for storing and providing sensor data, user data, and/or other information, as described herein. In these and other embodiments, controller 112 may be implemented with other components where appropriate, such as volatile memory, non-volatile memory, one or more interfaces, and/or various analog and/or digital components for interfacing with elements of system 100. For example, controller 112 may be adapted to store sensor signals, sensor information, parameters for image processing, calibration parameters, sets of calibration points, and/or other operational parameters, over time, for example, and provide such stored data to a user using user interface 114.

User interface 114 may be implemented as a display, a touch screen, a keyboard, a mouse, a joystick, a knob, and/or any other device capable of accepting user input and/or providing feedback to a user. In various embodiments, user interface 114 may be adapted to provide user input (e.g., as a type of signal and/or sensor information) to other elements of system 100, such as controller 112. User interface 114 may also be implemented with one or more logic devices that may be adapted to execute instructions, such as software instructions, implementing any of the various processes and/or methods described herein.

In various embodiments, user interface 114 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, and/or to otherwise facilitate operation of system 100 and devices within system 100. Once user interface 114 accepts a user input, the user input may be transmitted to other devices of system 100 over one or more communication links, where appropriate.

In some embodiments, user interface 114 may be adapted to accept user input to access a protected service, for example, such as clicking on a link to a website (e.g., within a browser application executed by authentication station 110) requiring identity verification before access to the website is allowed, or selecting a button or icon to request or complete a payment transaction displayed by user interface 114, or selecting a button or icon to unlock increased (less restricted) access to user interface 114 and/or applications executable by authentication station 110. Such user input may be provided to controller 112, for example, which may be configured to initiate an identity verification process, as described more fully herein.

Optical sensor 116 may be implemented as any optical sensing device capable of capturing a time sequence of visible spectrum image data. In general, such time sequence of image data may be of or associated with a user of authenticator device 120 and/or authentication station 110, and such user may be a validated user (e.g., with respect to a particular protected service or process). In one embodiment, optical sensor 116 may be implemented as a single pixel camera configured to capture a visible spectrum optical sequence including a time sequence of visible spectrum light which may itself include a plurality of different colors. For example, in embodiments where optical sensor 116 is implemented to sense 8-bit or greater RGB visible spectrum colors at a rate of 30 Hz, each element of the optical sequence may have a unique value selected from 16,777,216 possible color values, and each optical sequence may have any number of elements, up to 30 elements per second of the optical sequence for a 30 Hz version of optical sensor 116. Thus, the parameter space in which to embed an authentication identifier (e.g., associated with a validated user) can be varied for a particular optical sensor 116 by adjusting the number of elements in a particular optical sequence, or can be varied by increasing or decreasing the sense-able color depth of optical sensor 116.

In another embodiment, optical sensor 116 may be implemented as a multiple pixel camera (e.g., a focal plane array of visible spectrum light sensors) capable of capturing a time sequence of visible spectrum light which may itself include both a plurality of different colors and a plurality of different two dimensional patterns. In some embodiments, optical sensor 116 may be implemented with relatively few sensing pixels (e.g., 2, or 4), so as to be able to differentiate directionality of light (e.g., left, right, above, below) but not image enough detail to detect detailed patterns, such as the structure of a user's face. Such embodiments may be beneficial when authentication station 110 and/or authenticator device 120 are portable devices with limited power resources, such as batteries, for example, but benefit from being able to differentiate a single element emission source from a multiple element emission source (e.g., differentiate different types of authenticator devices from one another). In alternative embodiments, optical sensor 116 may be implemented with a relatively low resolution focal plane array of light sensors (e.g., equal to or less than 80, 100, or 480 vertical pixels) so as to require proximity (e.g., 5-100 cm) or minimal angular resolution of an emission source configured to generate an optical sequence of two dimensional patterns, so as to be sense-able by optical sensor 116.

In a particular embodiment, optical sensor 116 may be implemented with a conventional imaging sensor commonly found integrated with a portable electronic device, such as a smart phone. With such conventional relatively high resolution visible spectrum sensors (e.g., 12M pixel images, 4 k video at up to 60 Hz typical, or 1080p video at 240 fps for 2, 3, or more second bursts), optical sensor 116 may be configured to capture both an optical sequence and one or more images of a user face associated with the optical sequence. In specific embodiments, the user's face may be at least partially illuminated by the optical sequence, and corresponding images may be captured and stored for later auditing of a particular identity verification process, as described more fully herein.

Also shown in FIG. 1 are communication module 118 and other modules 119 of authentication station 110. Communication module 118 may be implemented with one or more amplifiers, modulators, phase adjusters, beamforming components, digital to analog converters (DACs), analog to digital converters (ADCs), various interfaces, antennas, transducers, and/or other analog and/or digital components allowing communication module 118 to transmit and/or receive signals, for example, in order to facilitate wired and/or wireless communications between one or more devices of system 100, such as establishing and using communication links 138 and/or 142, as shown.

Other modules 119 may include other and/or additional sensors, actuators, communications modules/nodes, structural components, optical transmitters, and/or user interface devices used to provide additional environmental information, for example, or to otherwise facilitate operation of authentication station 110 and/or system 100. In some embodiments, other modules 119 may include various environmental sensors providing measurements and/or other sensor signals that can be displayed to a user and/or used to facilitate operation of system 100 that compensates for environmental conditions, such as ambient light or orientation of authentication station 110, for example. In some embodiments, other modules 119 may include one or more structural components, such as a stand or mount to fix authentication station securely to a particular position or according to a particular orientation.

In general, authenticator device 120 of identity verification system 100 may be implemented by a smart watch, a pair of smart glasses or spectacles, an electronic badge, and/or other wearable electronic device including one or more of the elements of authenticator device 120 shown in FIG. 1. In FIG. 1, authenticator device 120 includes a controller 122, a memory 123, an optical transmitter 126 generating visible spectrum optical sequence 130, a communication module 128 facilitating a communication link 138 and/or 143, and other modules 129, which may each be configured to facilitate operation of authenticator device 120 and/or identity verification system 100. For example, controller 122 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for identity verification, for example, or a protected process, similar to controller 112.

Such software instructions may also implement methods for performing any of the various operations described herein. In addition, authenticator device 120 may be implemented with non-transitory memory 123 (e.g., a non-transitory medium, which may be considered another type of logic device) provided for storing machine readable instructions for loading into and execution by controller 122, for example, or for storing and providing sensor data, user data, and/or other information, as described herein. In these and other embodiments, controller 122 may be implemented with other components where appropriate, such as volatile memory, non-volatile memory, one or more interfaces, and/or various analog and/or digital components for interfacing with elements of system 100.

Optical transmitter 126 may be implemented as one or more optical transmission devices capable of generating a time sequence of visible spectrum image data. In general, such time sequence of image data may be of or associated with a user of authenticator device 120 and/or authentication station 110, and such user may be a validated user. In one embodiment, optical transmitter 126 may be implemented as a single emitter optical transmitter configured to generate a visible spectrum optical sequence including a time sequence of visible spectrum light which may itself include a plurality of different colors (e.g., with a particular color depth, such as 8-bit or greater RGB visible spectrum colors at various rates, including 15, 30, 60, 120, and 240 Hz). As with optical sensor 116, the parameter space in which to embed an authentication identifier (e.g., associated with a validated user) can be varied by adjusting the number of elements (e.g., time slices) in a particular optical sequence, or can be varied by increasing or decreasing the color depth of optical transmitter 126.

In another embodiment, optical transmitter 126 may be implemented as a multiple emitter optical transmitter capable of generating a time sequence of visible spectrum light which may itself include both a plurality of different colors and a plurality of different two dimensional patterns. In some embodiments, optical transmitter 126 may be implemented with relatively few emitters (e.g., 2, or 4), so as to be able to generate light with minimally differentiable direction (e.g., left, right, above, below). Such embodiments may be beneficial when authentication station 110 and/or authenticator device 120 are portable devices with limited power resources but benefit from being able to differentiate different types of authenticator devices from one another. In alternative embodiments, optical transmitter 126 may be implemented with a relatively low resolution array of light emitters (e.g., equal to or less than 80, 100, or 480 vertical pixels) so as to require proximity (e.g., 5-100 cm) or provide minimal angular resolution of emitted optical sequences of two dimensional patterns. In a particular embodiment, optical transmitter 126 may be implemented with a conventional pixel display commonly found integrated with a portable electronic device, such as a smart phone (e.g., with approximately 300, 400, or higher pixels per inch emitters/displays, at up to 60 Hz), and optical transmitter 126 may be configured to generate optical sequences with relatively high resolution two dimensional patterns (e.g., for higher effective data transfer rates, for example). In various embodiments, optical transmitter 126 may be implemented with various optical elements, such as lenses, shutters, and/or other optical elements, for example, to facilitate operation of optical transmitter 126.

Also shown in FIG. 1 are communication module 128 and other modules 129 of authentication station 110. Communication module 128 may be implemented with one or more amplifiers, modulators, phase adjusters, beamforming components, digital to analog converters (DACs), analog to digital converters (ADCs), various interfaces, antennas, transducers, and/or other analog and/or digital components allowing communication module 128 to transmit and/or receive signals, for example, in order to facilitate wired and/or wireless communications between one or more devices of system 100, such as establishing and using communication links 138 and/or 143, as shown. In some embodiments, authenticator device 120 may be configured to communicate directly with server 146 (e.g., over network 140) to establish an authentication identifier associated with a validated user, for example.

Other modules 129 may include other and/or additional sensors (e.g., optical sensors), actuators, communications modules/nodes, structural components, and/or user interface devices used to provide additional environmental information, for example, or to otherwise facilitate operation of authenticator device 120 and/or system 100. In some embodiments, other modules 129 may include various environmental sensors providing measurements and/or other sensor signals that can be used to facilitate operation of system 100 that compensates for environmental conditions, such as ambient light or orientation of authenticator device 120, for example. In some embodiments, other modules 129 may include one or more structural components, such as a clip, strap, lanyard, or frame, for example, to fix authenticator device 120 securely to a particular position on a user or according to a particular orientation.

Network 140 may include one or more local area or wide area wired or wireless networks or aggregation of networks, such as a LAN, WAN, cellular network, or the Internet, for example, allowing authentication station 110 and/or authenticator device 120 to communicate with server 146 (e.g., over one or more wired and/or wireless communication links 142, 143, and/or 144). Server 146 may be a webserver, a transaction server, or other server device configured to enroll and/or validate users, for example, and/or to provide protected services and/or content. In some embodiments, server 146 may be configured to service financial transaction requests, provide or otherwise mediate protected media delivery (e.g., subscription media), and/or otherwise provide one or more types of protected services.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing any of the methods described herein. In one embodiment, such method may include instructions for forming one or more communication links between various devices of system 100.

In addition, one or more non-transitory mediums may be provided for storing machine-readable instructions for loading into and execution by any logic device implemented with one or more of the elements of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals or data or information may be communicated among elements of system 100 using a variety of wired and/or wireless communication techniques, including voltage signaling, Ethernet, WiFi, Bluetooth, BluetoothLE, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of devices of system 100 may be integrated with each other, for example, or may be integrated onto a single printed circuit board (PCB) to reduce system complexity, manufacturing costs, power requirements, and/or timing errors between the various sensor measurements.

Figure 2:
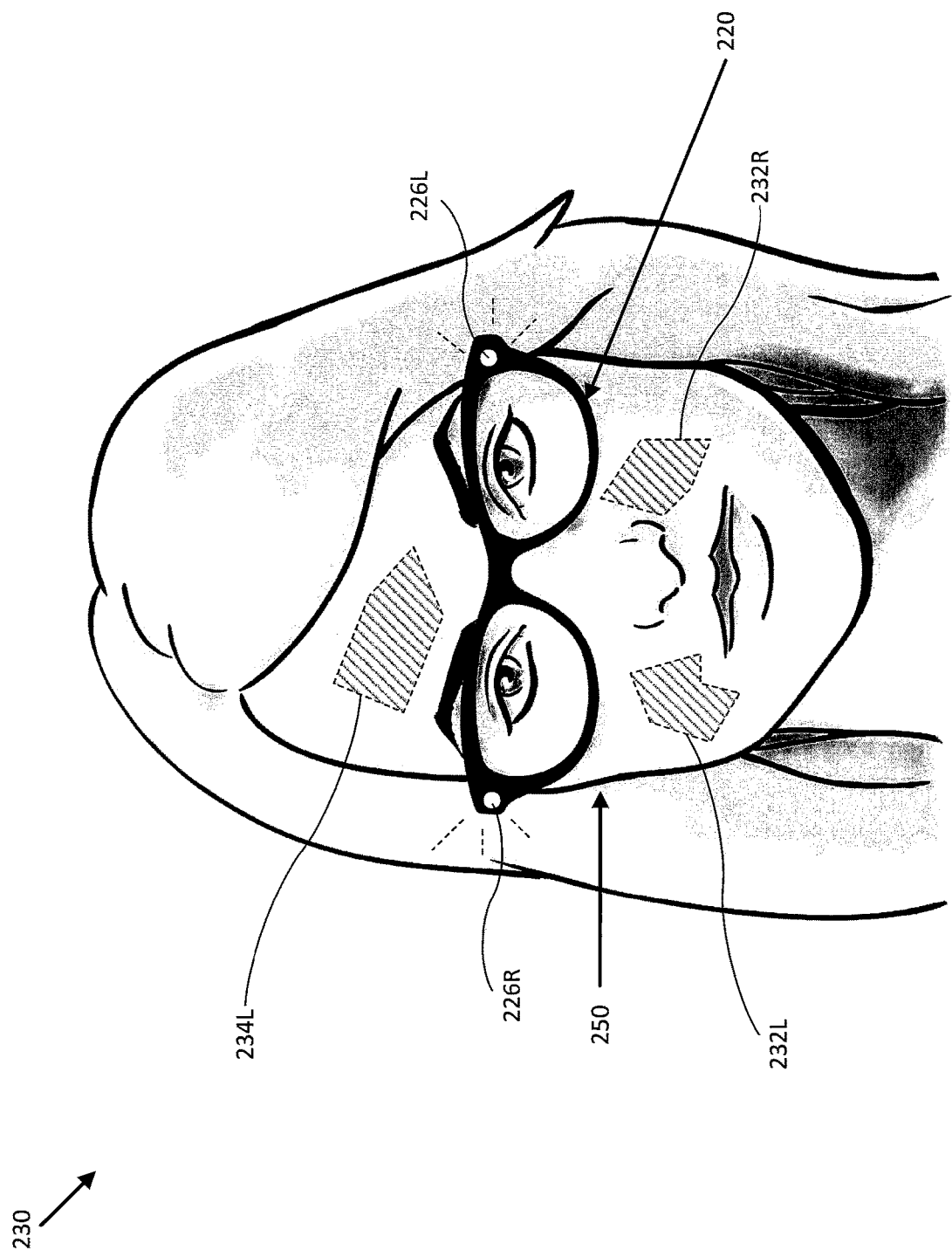
FIG. 2 illustrates a diagram of an authenticator device for an identity verification system in accordance with an embodiment of the disclosure.

FIG. 2 illustrates a diagram of an authenticator device 220 (e.g., smart glasses or spectacles) for identity verification system 100 in accordance with an embodiment of the disclosure. In particular, FIG. 2 shows a diagram of a visible spectrum optical sequence 230, which may include visible spectrum image data associated with one or more of authenticator device 220, optical transmitters 226R and 226L of authenticator device 220, a user face shadow 232R associated with optical transmitter 226R illuminating user face 250, and user face shadows 232L and 234L associated with optical transmitter 226L illuminating a user face 250, as shown. Each of optical transmitters 226R and 226L and/or portions of authenticator device 220 may be implemented with optics (e.g., wide angle and/or hemispherical lenses and/or fiber optics) configured to cause emissions from optical transmitters 226R and 226L to illuminate portions of user face 250. In some embodiments, authentication station 110 may be implemented with a relatively high resolution visible spectrum camera, for example, and be able to capture both a visible spectrum optical sequence generated by optical transmitters 226R and 226L (e.g., which may itself include some two dimensional spatial patterns) and at least one image of user face 250 that is at least partially illuminated by the visible spectrum optical sequence generated by optical transmitters 226R and 226L.

In some embodiments, such illumination may allow captured images of user face 250 to include detail sufficient to audit identity verification processes by linking stored images of user face 250 to a particular identity verification. Storage and/or transmission of such images (e.g., to server 146) may be implemented as part of a protected process, for example, or an identity verification process. For example, at every successful identity verification, a corresponding image may be stored (e.g., in authentication station 110 and/or server 146) so that execution of the protected process may be correlated with the image and the identity of the user wearing authenticator device 120 (e.g., at the time the protected process executes) may be compared to the validated user. Alternatively, if a failed identity verification is detected, a captured image may be automatically transmitted to server 146, which may then transmit the image to a corresponding verified user to alert the verified user, for example, or to an operator of a protected service.

In additional embodiments, images of user face 250 may include an optical sequence of user face shadows 232R and 232L and 234L, for example, which represent a three dimensional structure of user face 250. In such embodiments, user face shadows 232R and 232L and 234L may be used to verify a user of authenticator device 120 (e.g., by comparing to corresponding stored user face shadows) in addition to verifying the authentication identifier in the visible spectrum optical sequence generated by optical transmitters 226R and 226L. In some embodiments, the verifying the authentication identifier includes comparing at least one image of user face 250 to at least one stored image of a corresponding verified user face (e.g., verification of an authentication identifier cannot successfully complete without user face 250 and/or user face shadows 232R and 232L and 234L substantially matching corresponding structure of a verified user face).

Figure 3:
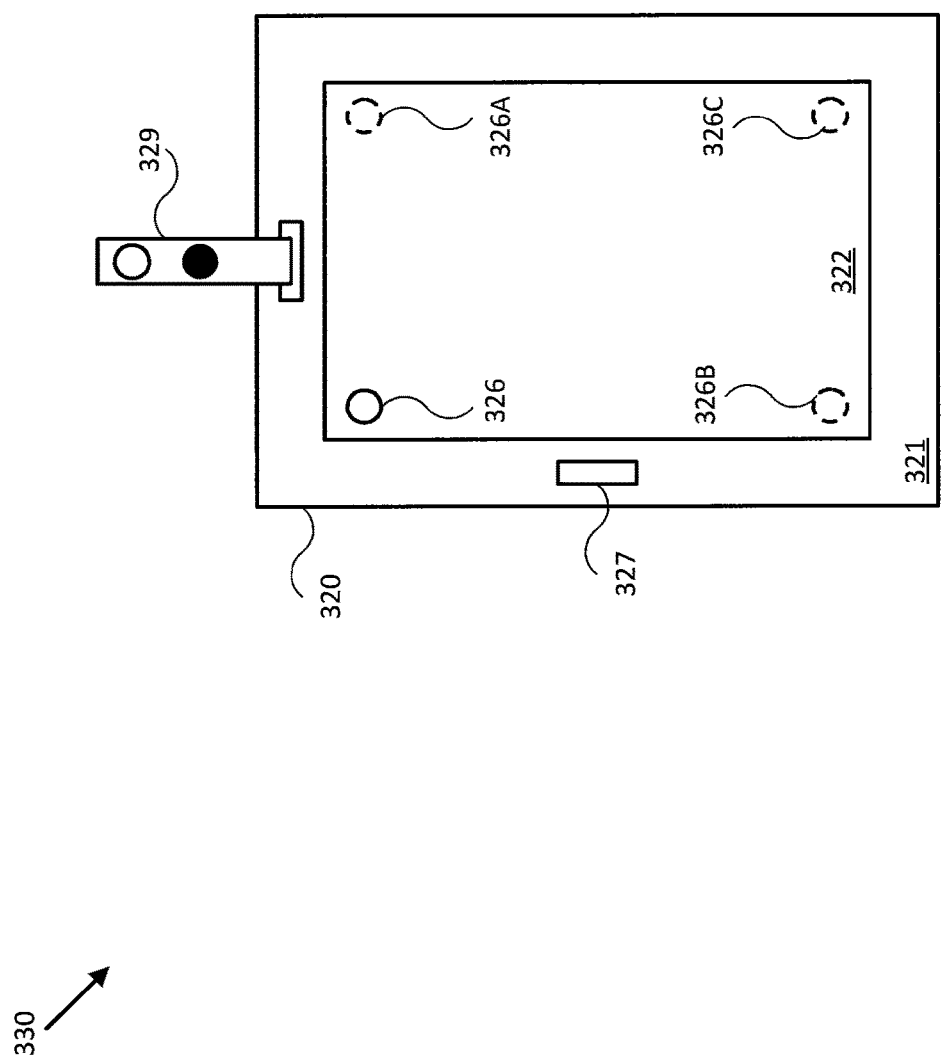
FIG. 3 illustrates a diagram of an authenticator device for an identity verification system in accordance with an embodiment of the disclosure.

FIG. 3 illustrates a diagram of an authenticator device 320 (e.g., an electronic badge) for identity verification system 100 in accordance with an embodiment of the disclosure. In particular, FIG. 3 shows a diagram of a visible spectrum optical sequence 330, which may include visible spectrum image data associated with one or more of authenticator device 320 and an optical transmitter 326 and/or optional optical transmitters 326A, 326B, and 326C of authenticator device 320, as shown. In some embodiments, authenticator device 320 may include a display 322, in addition or as an alternative to optical transmitters 326, 326A, 326B, and 326C, which may be configured to provide an optical sequence of relatively high resolution two dimensional patterns, which may be sensed by embodiments of authentication station 110, as described herein. Authenticator device 320 may optionally include a border 321 (e.g., to help differentiate optical sequences from background), and one or more slots 327 and/or straps 329 to secure authenticator device 320 to a user. In some embodiments, authentication station 110 may be include a relatively high resolution optical sensor 116 capable of capturing all of authenticator device 320 and a face and/or other structure of a user wearing authenticator device 320, which may be used for auditing and/or additional verification processes, as described herein.

Figure 4:
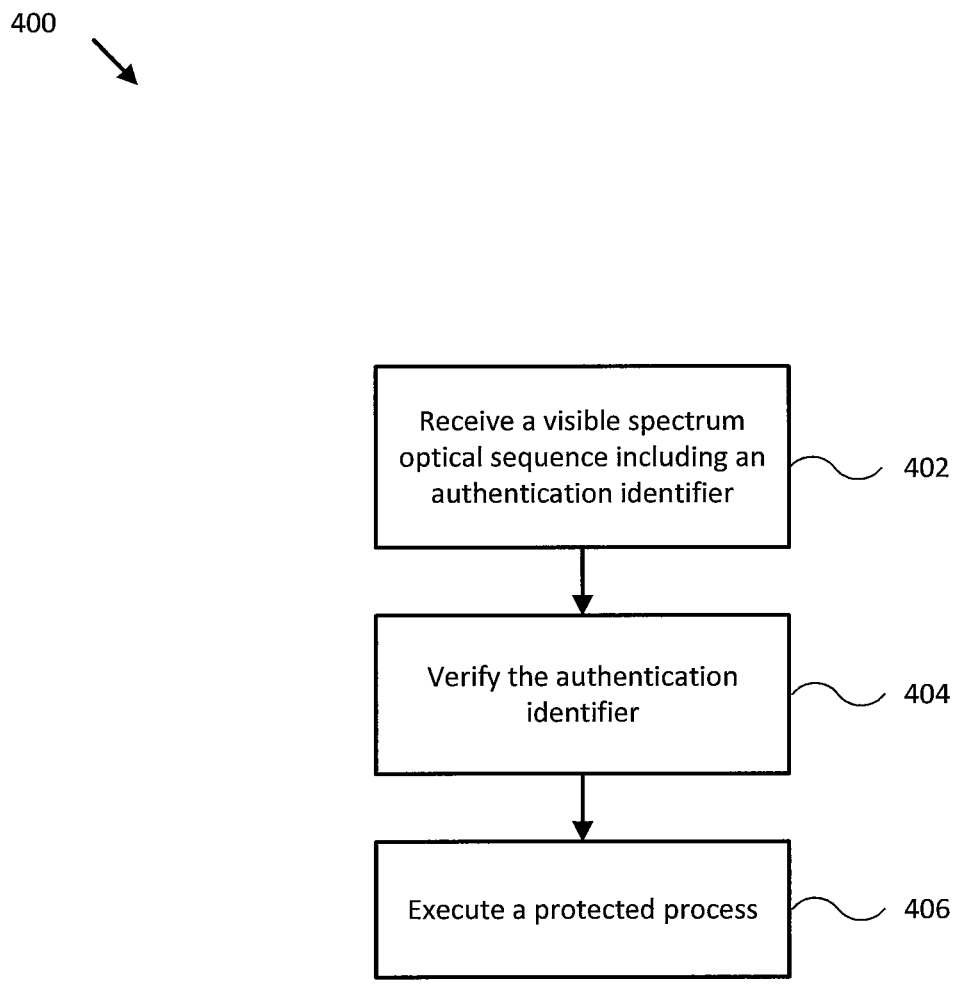
FIG. 4 illustrates a flow diagram of various operations to operate an identity verification system in accordance with an embodiment of the disclosure.

FIG. 4 illustrates a flow diagram of various operations to operate authentication station 110 for identity verification system 100 in accordance with an embodiment of the disclosure. In some embodiments, the operations of FIG. 4 may be implemented as software instructions executed by one or more logic devices associated with corresponding electronic devices, sensors, and/or structures depicted in FIGS. 1 through 3. More generally, the operations of FIG. 4 may be implemented with any combination of software instructions and/or electronic hardware (e.g., inductors, capacitors, amplifiers, actuators, or other analog and/or digital components).

It should be appreciated that any step, sub-step, sub-process, or block of process 400 may be performed in an order or arrangement different from the embodiments illustrated by FIG. 4. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 400 is described with reference to systems described in reference to FIGS. 1-3, process 400 may be performed by other systems different from those systems and including a different selection of electronic devices, sensors, and/or transmitters.

Process 400 represents a method for providing identity verification using system 100 and/or authenticator devices 220 and/or 320 in accordance with embodiments of the disclosure. At the initiation of process 400, various system parameters may be populated by prior execution of a process similar to process 400, for example, or may be initialized to zero and/or one or more values corresponding to typical, stored, and/or learned values derived from past operation of process 400, as described herein. In one embodiment, communication module 118 may be configured to receive an authentication identifier from server 146 over communication link 142, and/or to transmit an authentication identifier and/or a shared secret or process to authenticator device 120 over communication link 138. In another embodiment, user interface 114 of authentication station 110 may be configured to receive user input initiating a receiving mode of authentication station 110 to ready optical sensor 116 for capturing of a visible spectrum optical sequence including an authentication identifier, as described herein.

In block 402, a logic device receives a visible spectrum optical sequence including an authentication identifier. For example, controller 112 of authentication station 110 may be configured to receive visible spectrum optical sequence 130 from optical sensor 116, where visible spectrum optical sequence 130 includes an authentication identifier associated with a validated user. In some embodiments, visible spectrum optical sequence 130 may include a time sequence of visible spectrum light including a plurality of different colors. In other embodiments, visible spectrum optical sequence 130 may include a time sequence of visible spectrum light including a plurality of different colors and a plurality of different two dimensional patterns (e.g., generated by a multiple emitter optical transmitter). An authentication identifier may be encrypted and embedded within the sequences of color values and/or sequences of two dimensional patterns of the visible spectrum optical sequence so as to be secure from replay attacks and/or from capture and decryption by devices other than the intended authentication station 110.

In various embodiments, the visible spectrum optical sequence may be implemented according to one or more transmission protocols to facilitate a particular operational mode of authentication station 110. For example, in one embodiment, such protocol may include a preamble portion, a body portion, and a termination portion. The preamble portion may include an optical sequence configured to initialize authentication station 110, differentiate the preamble portion from the body portion, and ready optical sensor 116 for capture of the body portion (e.g., according to a particular time sequence or capture rate, for example). The body portion may include the authentication identifier and/or other information communicated by authenticator device 120. The termination portion may include an optical sequence configured to disable authentication station 110 or return it to a state prior to receiving the preamble portion.

Typically, a validated user is a user with established credentials to access a protected service, such as execution of an application or sub-process stored within the authentication station, execution of a communication process, execution of a transaction process, execution of a service login process (e.g., to access protected content), and/or execution of a device unlock process (e.g., to unlock authentication station 110). Such credentials may be established by conventional techniques, for example, and may result in generation of an authentication identifier (e.g., by authentication station 110 and/or server 146). Such authenticated identifier may include various forms of data, such as a unique bit code, image data, processed image data, a token, a signature, a certificate, a string, and/or other information or data (e.g., or hashed or otherwise processed versions of same) that can be used to uniquely identify a validated user and distinguish a validated user from other validated users and un-validated users. A generated authentication identifier may then be transmitted to other elements of system 100 (e.g., in encrypted or otherwise secured form) to facilitate identity verification, as described herein.

In some embodiments, once visible spectrum optical sequence 130 is received, controller 112 may be configured to extract the authentication identifier from visible spectrum optical sequence 130 prior to moving to block 404. For example, controller 112 may be configured to decrypt and extract the authentication identifier from visible spectrum optical sequence 130, such as according to a shared secret or process exchanged previously or concurrently (e.g., over communication link 138). In other embodiments, visible spectrum optical sequence 130 may be transmitted to server 146 for extraction as part of verifying the authentication identifier (e.g., block 404), or an already extracted authentication identifier may be transmitted to server 146, as described herein.

In block 404, a logic device verifies an authentication identifier. For example, controller 112 of authentication station 110 may be configured to verify the authentication identifier within visible spectrum optical sequence 130 received in block 404. In some embodiments, an authentication identifier extracted from visible spectrum optical sequence 130 in block 402 may be verified against a locally stored copy or the authentication identifier, such as by a comparison. Such embodiments may include comparing hashes or otherwise obscured versions (e.g., one way functions) of the authentication identifier. Moreover, such embodiments allow the identity verification process to proceed offline. In other embodiments, either visible spectrum optical sequence 130 or an already extracted authentication identifier may be transmitted to server 146 for extraction or comparison, and if the verification is successful, a verified authentication identifier may be received from server 146. Such embodiments allow the identity verification process to be blocked if authentication station is offline, for example, and allow identity verification even when a validated user is presenting an authentication identifier to authentication station 110 for the first time.

In some embodiments, the visible spectrum optical sequence may include an authentication identifier associated with both a validated user and a validated user group, such as a family group, so that the combined authentication identifier can be shared across multiple users. In related embodiments, the portions of the authentication identifier associated with the validated user and the validated user group may be intertwined (e.g., according to checksum or similar self-contained technique) so that changes to the validated user or the validated user group cause a verification failure until the entire authentication identifier (and copied thereof) are updated. In similarly related embodiments, the authentication identifier may be associated with both a validated user (and/or a user group) and a transaction validator. In such embodiments, verification of the transaction validator may be performed locally (e.g., within authentication station 110) so that a partially verified transaction/protected service access may take place without access to server 146 (e.g., an offline transaction), which could be used to verify the remaining portions of the authentication identifier for a fully verified transaction/protected service access. As such, fully verified transactions/protected service accesses may require eventual online access to server 146. Embodiments facilitate reconciliation of such transactions/accesses after the fact by providing auditable data (e.g., images of a user's face and/or other structure) that can be stored and linked to each execution of a protected process, as described herein.

In block 406, a logic device executes a protected process. For example, controller 112 of authentication station 110 may be configured to execute a protected process associated with the authentication identifier verified in block 404. In various embodiments, such protected process may include one or more of an application or sub-process stored within the authentication station, a communication process (e.g., to allow communication to a protected service provider), a transaction process (e.g., to request or complete a financial transaction), a service login process (e.g., to access protected content on a website), and/or a device unlock process (e.g., to access a less restricted or unrestricted version of user interface 114, for example, or to unlock a physical perimeter security device, such as a door lock).

It is contemplated that any one or combination of methods to provide identity verification may be performed according to one or more operating contexts of a control loop, for example, such as a startup, learning, running, and/or other type operating context. For example, process 400 may proceed back to block 402 and proceed through process 400 again to produce updated or supplemental identity verification, as in a control loop.

Figure 5:
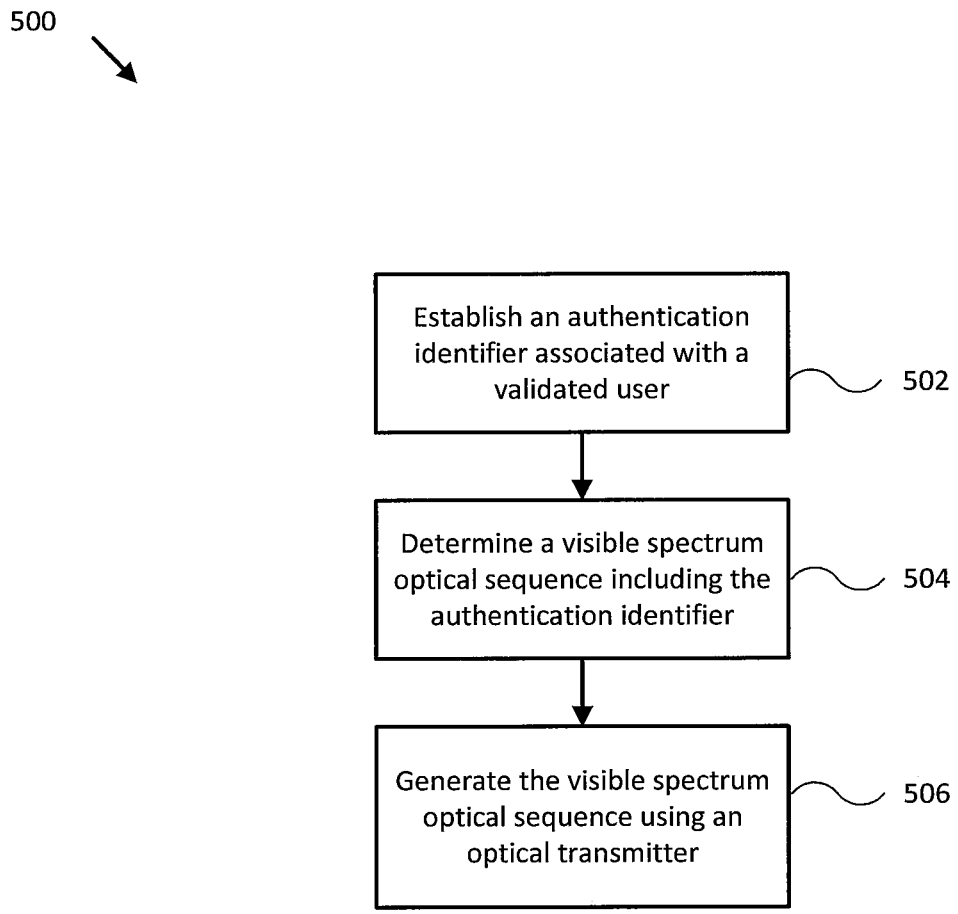
FIG. 5 illustrates a flow diagram of various operations to operate an identity verification system in accordance with an embodiment of the disclosure.

FIG. 5 illustrates a flow diagram of various operations to operate authenticator device 120 for identity verification system 100 in accordance with an embodiment of the disclosure. In some embodiments, the operations of FIG. 5 may be implemented as software instructions executed by one or more logic devices associated with corresponding electronic devices, sensors, and/or structures depicted in FIGS. 1 through 3. More generally, the operations of FIG. 5 may be implemented with any combination of software instructions and/or electronic hardware (e.g., inductors, capacitors, amplifiers, actuators, or other analog and/or digital components).

It should be appreciated that any step, sub-step, sub-process, or block of process 500 may be performed in an order or arrangement different from the embodiments illustrated by FIG. 5. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 500 is described with reference to systems described in reference to FIGS. 1-3, process 500 may be performed by other systems different from those systems and including a different selection of electronic devices, sensors, and/or transmitters.

Process 500 represents a method for providing identity verification using system 100 and/or authenticator devices 220 and/or 320 in accordance with embodiments of the disclosure. At the initiation of process 500, various system parameters may be populated by prior execution of a process similar to process 500, for example, or may be initialized to zero and/or one or more values corresponding to typical, stored, and/or learned values derived from past operation of process 500, as described herein.

In block 502, a logic device establishes an authentication identifier associated with a validated user. For example, controller 122 of authenticator device 120 may be configured to establish an authentication identifier associated with a validated user of a protected service provided or otherwise mediated by server 146. In one embodiment, controller 122 may be configured to establish communication link 138 with authentication station 110 via communication module 128 of authenticator device 120 and receive the authentication identifier from authentication station 110 over communication link 138. In another embodiment, controller 122 may be configured to establish communication link 143 with server 146 via communication module 128 and receive the authentication identifier from server 146 over communication link 143. Controller 122 may also be configured to receive a shared secret or process over communication links 138 and/or 143, where the shared secret or process may be used to secure optical sequences emitted by optical transmitter 126 against replay attacks and/or from capture and decryption by devices other than the intended authentication station 110.

In other embodiments, controller 122 may be configured to receive a first visible spectrum optical sequence generated by authentication station 110 (e.g., a display of user interface 114, or other modules 119), from an optical sensor of authenticator device 120 (e.g., other modules 129), where the first visible spectrum optical sequence includes the authentication identifier. Controller 122 may then extract the authentication identifier from the first visible spectrum optical sequence prior to moving to block 504. In related embodiments, authenticator device 120 may be implemented with a user button or other user interface element (e.g., LED, speaker buzzer, elements of other modules 129) configured to accept user input selecting an authentication identifier and/or to provide user feedback indicating an authentication identifier has been received and/or stored in memory 123.

In block 504, a logic device determines a visible spectrum optical sequence comprising an authentication identifier. For example, controller 122 of authenticator device 120 may be configured to determine visible spectrum optical sequence 130 comprising the authentication identifier established in block 502. In some embodiments, controller 122 may be configured to encrypt the authentication identifier according to a shared secret (e.g., a key) or process for secure communication within visible spectrum optical sequence 130 to authentication station 110. In related or supplemental embodiments, controller 122 may be configured to use a particular protocol to determine visible spectrum optical sequence 130, such as a protocol including a preamble portion, a body portion, and a termination portion, as described herein.

In block 506, a logic device generates a visible spectrum optical sequence using an optical transmitter. For example, controller 122 of authenticator device 120 may be configured to generate visible spectrum optical sequence 130 determined in block 504 using optical transmitter 126 of authenticator device 120. In one embodiment, optical transmitter 126 may include a single emitter optical transmitter, for example, and visible spectrum optical sequence 130 may include a time sequence of visible spectrum light comprising a plurality of different colors, as described herein. In another embodiment, authenticator device 120 may be implemented according to authenticator device 220 (e.g., a pair of spectacles) including optical transmitters 226R and 226L, or according to authenticator device 320 (e.g., an electronic badge) including optical transmitters 326, 326A, 326B, 326C, and/or display 322 (e.g., both implemented with a multiple emitter optical transmitter), and visible spectrum optical sequence 130 may include a plurality of different colors and a plurality of different two dimensional patterns, each of which may be used to encode a particular authentication identifier within visible spectrum optical sequence 130, as described herein. In further embodiments, authenticator device may be implemented as at least one of a pair of spectacles, an electronic badge, a smart watch, a smart phone, and/or a wearable electronic device, each implemented with one or more single emitter optical transmitters or a display/multiple emitter optical transmitter.

In various embodiments, both the color of each sequence element (e.g., each state of the multiple states that make up the sequence) and the timing of the sequence (e.g., how long a particular color is emitted, or a particular timing pattern of the optical sequence or a portion of the optical sequence) may be used to encode the authentication identifier and/or associated information. Such associated information may include, for example, a time and/or date of the generation of visible spectrum optical sequence 130, the number of times the particular authentication identifier has been transmitted, a time and/or date the authentication identifier was first stored within authenticator device 120 and/or transmitted by authenticator device 120, and/or other information associated with identity verification and operation of authenticator device 120.

In additional embodiments, generation of visible spectrum optical sequence 130 may be initiated using various techniques, according to an operational mode of authenticator device 120. For example, generation of visible spectrum optical sequence 130 may be initiated manually by user input (e.g., provided to a button or other user interface element of authenticator device 120), or by an initialization message received over communication link 138 via communication module 128 from authentication station 110. In embodiments where authenticator device 120 includes a vibration or motion sensor (other modules 129), generation of visible spectrum optical sequence 130 may be initiated by tapping or shaking authenticator device 120. In embodiments where authenticator device 120 includes its own optical sensor, generation of visible spectrum optical sequence 130 may be initiated by a particular optical sequence generated by authentication station 110 (e.g., by a display of user interface 114). In still further embodiments, authenticator device 120 may be placed in a beacon mode (e.g., through user input provided to a user interface element of authenticator device 120), where authenticator device 120 is configured to repeatedly generate visible spectrum optical sequence 130 continuously until further user input is provided to end the beacon mode. In various embodiments, authentication station 110 may be configured to display a message or icon indicating to a user to initiate generation of visible spectrum optical sequence 130 when authentication station 110 is ready to capture visible spectrum optical sequence 130 in accordance with providing access to protected content, as described herein.

It is contemplated that any one or combination of methods to provide identity verification may be performed according to one or more operating contexts of a control loop, for example, such as a startup, learning, running, and/or other type operating context. For example, process 500 may proceed back to block 502 and proceed through process 500 again to produce updated or supplemental identity verification, as in a control loop.

Embodiments of the present disclosure can thus provide feature rich and convenient identity verification for access to protected services. Such embodiments may be used to provide reliable identity verification with visible feedback to a user so as to reduce potential user frustration otherwise arising with invisible identity verification techniques and generally uncorrelated progress graphics. Additionally, embodiments provide for reliable auditing of identity verifications after-the-fact by including and/or encouraging memorialization of the verification by visible spectrum imaging of the user at the time of verification and/or execution of a requested protected process.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising an authentication station, the authentication station comprising:
   an optical sensor configured to capture a visible spectrum optical sequence emitted from a wearable device associated with a validated user; and
   a logic device configured to communicate with the optical sensor, wherein the logic device is configured to perform operations comprising:
      receiving the visible spectrum optical sequence comprising a time sequence of visible spectrum light emitted from the wearable device and captured by the optical sensor, wherein the time sequence of visible spectrum light is uninterrupted and comprises an authentication identifier associated with the validated user;
      verifying the authentication identifier; and
      executing a protected process associated with the verified authentication identifier.

2. The system of claim 1, wherein the operations further comprise:
   extracting the authentication identifier from the received visible spectrum optical sequence prior to verifying the authentication identifier.

3. The system of claim 1, wherein the authentication station further comprises a communication module configured to establish a communication link with a remote server, and wherein the verifying the authentication identifier comprises:
   transmitting the visible spectrum optical sequence or the authentication identifier to the remote server over the communication link with the remote server for verification via the remote server; and
   receiving the verified authentication identifier from the remote server over the communication link.

4. The system of claim 1, wherein:
   the optical sensor comprises a single pixel camera; and
   the time sequence of visible spectrum light comprises a plurality of different colors.

5. The system of claim 1, wherein:
   the optical sensor comprises a multiple pixel camera; and
   the time sequence of visible spectrum light comprises a plurality of different colors and a plurality of different two dimensional patterns.

6. The system of claim 1, wherein:
   the optical sensor comprises a multiple pixel camera;
   the operations further comprise receiving at least one image of a user face at least partially illuminated by the visible spectrum optical sequence emitted from the wearable device; and
   the executing the protected process comprises storing the at least one received image of the user face.

7. The system of claim 1, wherein:
   the protected process comprises an application or a sub-process stored within the authentication station, a communication process, a transaction process, a service login process, and/or a device unlock process.

8. A method comprising:
   receiving a visible spectrum optical sequence from a device worn by a validated user, the visible spectrum optical sequence comprising a time sequence of visible spectrum light from an optical sensor of an authentication station, wherein the time sequence of visible spectrum light is uninterrupted and comprises an authentication identifier associated with the validated user;
   verifying the authentication identifier; and
   executing a protected process associated with the verified authentication identifier.

9. The method of claim 8, further comprising:
   extracting the authentication identifier from the received visible spectrum optical sequence prior to verifying the authentication identifier.

10. The method of claim 8, wherein the verifying the authentication identifier comprises:
    transmitting the visible spectrum optical sequence or the authentication identifier to a remote server over a communication link with the remote server for verification via the remote server; and
    receiving the verified authentication identifier from the remote server over the communication link.

11. The method of claim 8, wherein:
    the time sequence of visible spectrum light comprises a plurality of different colors.

12. The method of claim 8, wherein:
    time sequence of visible spectrum light comprises a plurality of different colors and a plurality of different two dimensional patterns.

13. The method of claim 8, further comprising:
receiving at least one image of a user face at least partially illuminated by the visible spectrum optical sequence,
wherein the verifying the authentication identifier comprises comparing the at least one received image of the user face to at least one stored image of a verified user face.

14. The method of claim 8, wherein:
the protected process comprises an application or a sub-process stored within the authentication station, a communication process, a transaction process, a service login process, and/or a device unlock process.

15. A method comprising:
establishing an authentication identifier associated with a validated user;
determining a visible spectrum optical sequence comprising the authentication identifier; and
wherein the visible spectrum optical sequence is generated using an optical transmitter of a wearable authenticator device, and wherein the generated visible spectrum optical sequence comprises an uninterrupted time sequence of visible spectrum light.

16. The method of claim 15, wherein the establishing the authentication identifier comprises:
establishing a communication link with an authentication station via a communication module of the wearable authenticator device; and
receiving the authentication identifier from the authentication station over the communication link.

17. The method of claim 15, wherein the visible spectrum optical sequence comprises a second visible spectrum optical sequence, and wherein the establishing the authentication identifier comprises:
receiving a first visible spectrum optical sequence generated by an authentication station, from an optical sensor of the wearable authenticator device, wherein the first visible spectrum optical sequence comprises the authentication identifier; and
extracting the authentication identifier from the first visible spectrum optical sequence prior to determining the second visible spectrum optical sequence comprising the authentication identifier.

18. The method of claim 15, wherein:
the optical transmitter of the wearable authenticator device comprises a single emitter optical transmitter; and
the uninterrupted time sequence of visible spectrum light comprises a plurality of different colors.

19. The method of claim 15, wherein:
the optical transmitter of the wearable authenticator device comprises a multiple emitter optical transmitter; and
the uninterrupted time sequence of visible spectrum light comprises a plurality of different colors and a plurality of different two-dimensional patterns.

20. The method of claim 15, wherein the wearable authenticator device comprises a pair of spectacles.

* * * * *